W. W. KAY.

CONDUCTOR'S CASH FARE REGISTER.

APPLICATION FILED MAY 1, 1911.

Reissued Feb. 27, 1912. 13,373.

2 SHEETS—SHEET 1.

Witnesses:
Geo. R. Radson
Wells L. Church

Inventor:
William W. Kay.
By Paul Bakewell Atty.

W. W. KAY.

CONDUCTOR'S CASH FARE REGISTER.

APPLICATION FILED MAY 1, 1911.

Reissued Feb. 27, 1912.

13,373.

2 SHEETS—SHEET 2.

Witnesses:
Geo. R. Cafson
Wells L. Turck

Inventor:
William W. Kay.
By Paul Bakewell Atty.

UNITED STATES PATENT OFFICE.

WILLIAM W. KAY, OF ST. LOUIS, MISSOURI, ASSIGNOR TO NATIONAL RECORDER COMPANY, OF ST. LOUIS, MISSOURI.

CONDUCTOR'S CASH-FARE REGISTER.

13,373. Specification of Reissued Letters Patent. Reissued Feb. 27, 1912.

Original No. 976,467, dated November 22, 1910, Serial No. 479,397. Application for reissue filed May 1, 1911. Serial No. 624,477.

*To all whom it may concern:*

Be it known that I, WILLIAM W. KAY, a citizen of the United States, residing at St. Louis, Missouri, have invented a certain new and useful Improvement in Conductors' Cash-Fare Registers, of which the following is a full, clear, and exact description, such as will enable others skilled in the art to which it appertains to make and use the same.

Figure 1:
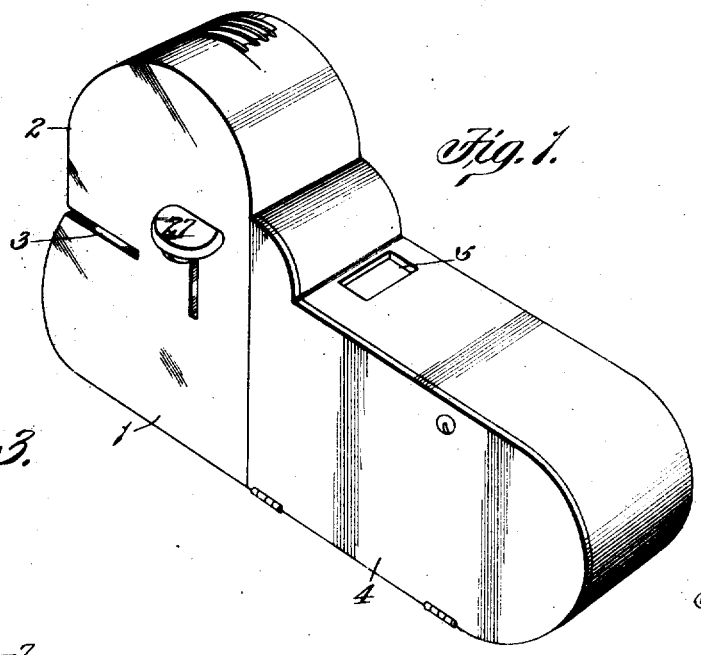
Figure 3:
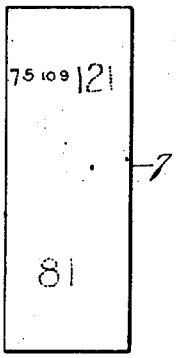
Figure 4:
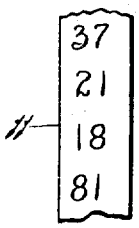
Figure 2:
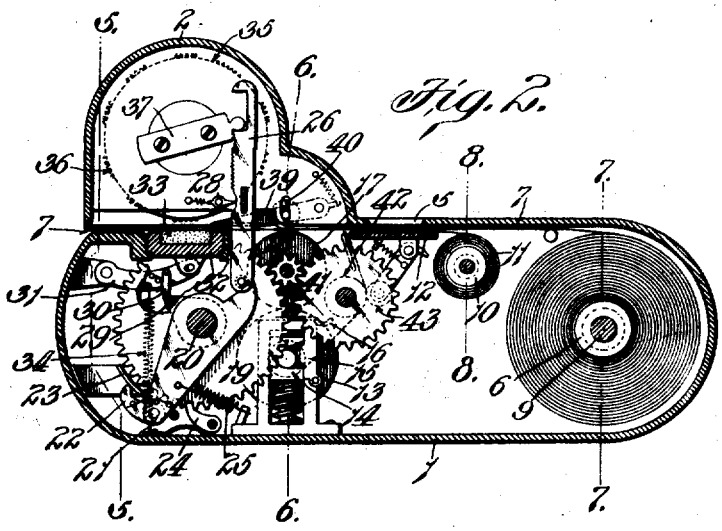
Figure 5:
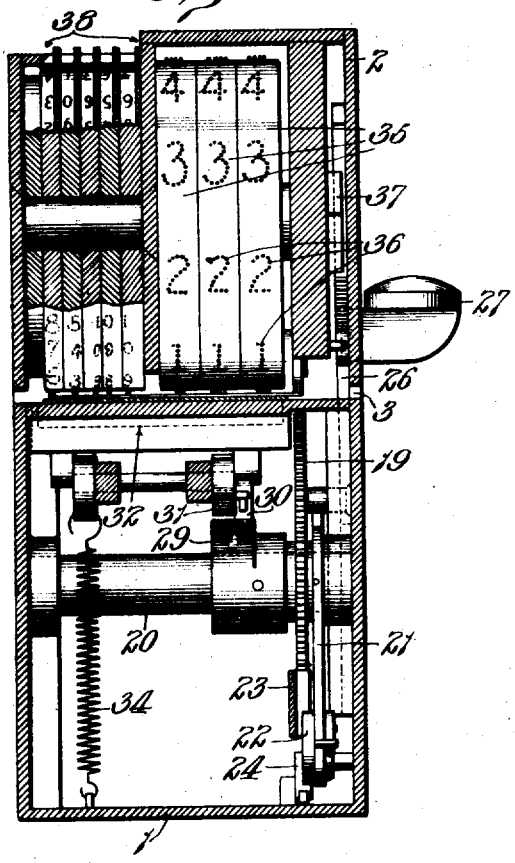
Figure 6:
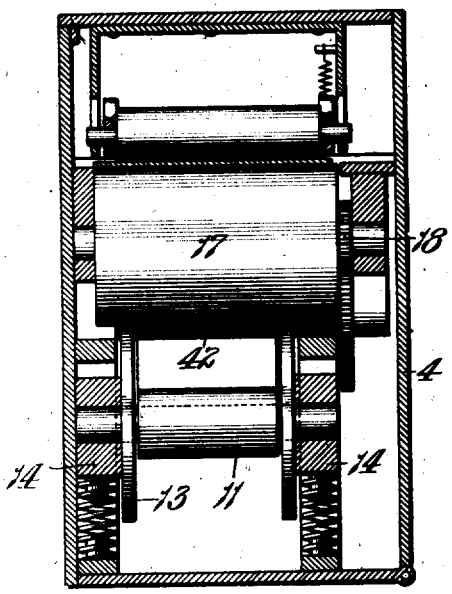
Figure 7:
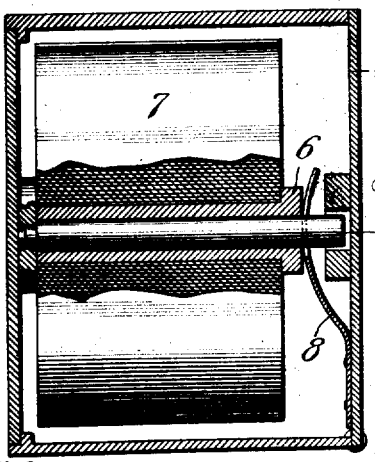
Figure 8:
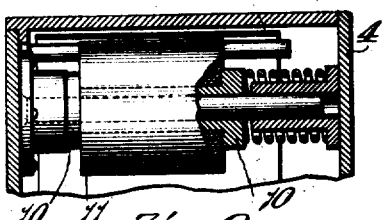

Figure 1 is a perspective view of my improved device; Fig. 2 is a longitudinal sectional view through the same; Fig. 3 is a detail view of the hat check or receipt issued by the device; Fig. 4 is a detail view of a portion of the permanent record retained in the device; Fig 5 is an enlarged cross sectional view on line 5—5 of Fig. 2; Fig. 6 is a cross sectional view on line 6—6 of Fig. 2; Fig. 7 is a cross sectional view on line 7—7 of Fig. 2; and Fig. 8 is a cross sectional view on line 8—8 of Fig. 2.

This invention relates to an improvement in conductors' cash fare registers of that character illustrated in U. S. Letters Patent Nos. 809,377 and 809,378, granted to me January 9th, 1906.

My present invention consists in a simplified construction of register that comprises means for canceling a ticket or cash-fare receipt and issuing a hat check containing a manual inscription that shows the relation which the check bears to the ticket, the register also being provided with means for recording the manual inscriptions that are placed on the checks.

In the register herein shown which represents the preferred form of my invention, the ticket-canceling devices at the time of canceling the ticket also place an identification mark on the hat check, which identification mark consists of the date, train number and preferably a serial number.

The register comprises a casing from which the checks are issued consecutively, and a permanent record arranged inside of the casing, the casing being so designed that the conductor or operator can place a manual inscription on each check prior to its delivery from the casing so as to show the relation which the check bears to the canceled ticket. This manual inscription preferably consists of a symbol or number that designates the station of destination which is printed on the canceled ticket for which the check serves as a receipt, and the permanent record inside of the casing is so arranged that the manual inscriptions which have been placed on the checks will appear consecutively on said record and thus show the order in which the checks were issued.

By the use of my invention, a traveling auditor can at any point and at any time check up a train, all of whose passengers must be accounted for, according to the condition of the conductor's register.

To briefly illustrate the use of my invention: The conductor, in "working" a train, is supposed to receive transportation of some character from each and every passenger, whether this transportation be in the form of ticket, mileage, cash fare, trip pass, annual, etc. Separate records are kept of annual transportation, or other forms of passes which are not taken up and canceled or receipted for. My invention is intended, primarily, to keep an accurate account of all forms of transportation in the way of mileage, tickets or cash fares, in which the railroad company is financially interested. To begin with, certain wheels in the device are adjusted to record the identification mark which in the device herein shown consists of the number of the train and the date. Other consecutive numbering wheels may be started at any point to carry on a series of numbers. When the conductor lifts a ticket, mileage, or issues a cash fare receipt, he places the ticket, or the like, in the mouth of the punch and operates the handle, which causes the ticket to be canceled by having printed thereon, or perforated therethrough, the train number, the date, and the serial number of the cancelation. These numbers are also recorded upon a hat check, which is issued either to the passenger or placed in a bracket for the inspection of the traveling auditor.

Hat checks are preferably in the form of a continuous web or paper in the machine, and after they are marked, are fed from the machine where they may be severed.

A permanent record is kept of the point of destination for which each hat check is issued, the number of the station appearing on said record and on said hat check.

In the drawings, 1 indicates the casing of the machine, which is provided with an overhanging head portion 2.

3 is the mouth of the machine in which the ticket or the like to be canceled is inserted.

4 is a door by which access may be gained to the interior.

5 is an opening in the top wall of the casing through which the conductor may inscribe a symbol or number that represents the station which is the destination of the passenger to or for whom the hat check is issued.

6 is a spool (see Fig. 7) on which is arranged a web of paper 7 to be issued and severed in the form of hat checks. A spring 8 mounted on the door 4 bears against spool 6 to produce retarding friction. Spool 6 is mounted on a fixed post 9 extending from the back plate of the machine.

10 is a spool on which is mounted a record strip 11, said record strip passing under the strip 7 and over platen 12, which platen is arranged under the opening 5. The under side of strip 7 is coated with pigment, so that when the conductor inscribes the number of station of destination on strip 7, the record thereof will be made on strip 11.

Strip 11 is wound upon a receiving spool 13 (see Fig. 6) whose axle is mounted in spring-pressed boxes 14 held in their guideways by hinged portions 15 (see Fig. 2), which hinged portions are locked in position by spring latches 16. The purpose of these spring-pressed boxes is to force the disks constituting the heads of spool 13 up against the surface of a driving cylinder 17, which driving cylinder is provided with pinion 18 at its end meshing with a gear 19. Gear 19 is mounted on shaft 20, on which shaft is pivotally mounted a pawl carrying lever 21. Pawl 22 carried by this lever, normally rests on a track plate 23, whereby, upon the initial movement of the lever, the pawl will not engage the path of gear 19, but will permit lever 21 to move through an arc of a circle equal to the length of pawl 22 over the track 23, before the lever 21 becomes engaged with the gear 19. A spring 25 restores the lever 21 to normal condition.

The upper end of lever 21 is provided with a shoulder, against which operates a roller or lateral projection on the lower end of an operating bar 26, which bar is provided with a handle 27 extending through a vertical slot in the casing, as shown in Fig. 1.

28 is a pawl coöperating with teeth or serrations on bar 26 to compel a full stroke.

When bar 26 is depressed, shaft 20 is rocked, but, as before stated, wheel 19 is permitted to remain idle during the initial depression of bar 26, during which time the ticket is canceled and a record made on the hat check of the train number, date, and serial number.

Printing impression is made from the recording mechanism as follows: 29 indicates a rock arm fixed to shaft 20 (see Fig. 5), which rock arm normally lies under a pawl 30 pivotally mounted on a lever 31. The inner end of lever 31 is connected to a platen support 32, in which is mounted a platen 33, preferably made of felt or other suitable material. This support 32 is guided vertically in its movement by suitable ways in the top casing or housing. When the bar 26 is depressed the arm 29 is moved upwardly from the position shown in Fig. 2, and carries with it pawl 30 and lever 31. In this manner the platen is lifted, forcing the ticket against the recording devices, to be canceled, and the hat check against said recording devices, to receive impressions of the numbers before referred to. As the arm 29 moves upwardly, it moves from under the pawl 30, whereupon a spring 34 restores the platen to normal condition. When the arm 29 is returned to its home position, pawl 30 is idly vibrated, being moved forwardly by arm 29 until said arm passes under said pawl.

The recording devices above referred to consist of three wheels 35 (see Fig. 5), constituting a counting mechanism on the peripheries of whose walls are puncturing points 36 arranged to indicate numbers. To the units wheel of this counting mechanism is arranged an arm 37 which coöperates with the bar 26, whereby, when said bar is depressed, the units wheel is advanced one number at a time, so as to print consecutive numbers on the tickets and hat checks. The construction of this counting mechanism forms no part of my present invention, as the same is already described in my aforesaid patent No. 809,378. The counting mechanism shown in my present invention, however, is closed against inspection and operation except through the depression of the bar 26. I prefer to have the counting mechanism sealed in the machine, because I have found it is unnecessary to restore the counting wheels to zero, as the office can make a record of the number at the time it issues the machine, and the proper officials will thus know the first number of the series on each trip.

38 indicate manually positioned wheels mounted alongside of the counting wheels 35, one of which, with large printing characters being used to designate the train number, while the others, with the small printing characters, may be adjusted to record the date as shown in Fig. 3, wherein "7" indicates the seventh month, July; "5," the day of the month; and "10," the year 1910.

39 indicates the spring-pressed lever which is used to force the ticket and hat check off from the puncturing needles as the platen is moved downwardly. This lever carries an idle roller 40, which holds the hat check against the cylinder 17, and when said cylinder 17 is rotated upon the last half of the depression of bar 26, it will issue the hat check containing the record of the transaction.

The cylinder 17 drives the spool 13 frictionally at a higher rate of speed than is necessary to wind up the permanent record. In order to always keep the record strip taut and to control the feed of the permanent record, I gear through wheel 41 a cylinder 42 to be driven at the same time that the hat check is being issued, whereby a predetermined portion of the record strip is wound on the receiving spool. A spring-pressed idler 43 holds the record strip against the cylinder 42, so that frictional contact will cause said record strip to be forcibly driven forward by each operation.

I am aware that minor changes in the construction, arrangement and combination of the several parts of my device can be made and substituted for those herein shown and described without in the least departing from the nature and principle of my invention.

Having thus described my invention, what I claim as new and desire to secure by Letters Patent is:

1. In an apparatus of the character described, the combination with a casing having an opening through which inscriptions may be manually made on a check, check-issuing mechanism, means for canceling a ticket and for recording identification marks on the check before it is issued, said issuing mechanism feeding said check forwardly beyond the point where the inscription has been made thereon.

2. In an apparatus of the character described, the combination with a casing having an opening through which inscriptions may be manually made on a check, check-issuing mechanism, ticket-canceling mechanism operable simultaneously therewith, means for recording identification marks on the check, and means for winding a permanent record strip on which is recorded the manual inscription only, said record strip being wound simultaneously with the issuance of said check.

3. In an apparatus of the character described, the combination with a casing having an opening, means for canceling a ticket and for feeding a check past said opening through which the station of destination is manually inscribed on said check and means for recording serial numbers on said checks.

4. In an apparatus of the character described, the combination with means for feeding a check past an opening where the station of destination may be inscribed thereon, means for recording the train number and date upon said check, and at the same time canceling a ticket or the like, with said numbers, and means for making a permanent record of the station of destination only.

5. In an apparatus of the character described, the combination with a casing having a ticket-receiving aperture, and an opening through which the station of destination may be manually written on a check to be issued, ticket-canceling devices in the form of puncturing devices arranged to represent numbers indicative of the train number, date and serial number, means for feeding a check to be punctured with said numbers at the time said ticket is canceled, means for effecting said puncturing operation before said check is issued, said means finally issuing said check, and means for retaining a permanent record of the station of destination written on said issued check.

6. In an apparatus of the character described, mechanism for feeding a strip of paper a predetermined distance coöperating with mechanism for feeding another strip of paper from an independent source of supply a relatively shorter distance, a rewinding device for the last-mentioned strip of paper, and yielding means tending to drive said re-winding device at an excessive speed.

7. In an apparatus of the character described, mechanism for feeding a strip of paper a predetermined distance coöperating with mechanism for feeding another strip of paper from an independent source of supply a relatively shorter distance, a rewinding device for the last-mentioned strip of paper, and yielding means tending to drive said re-winding device at an excessive speed, said driving means being actuated by the first-mentioned paper-feeding mechanism.

8. In an apparatus of the character described, a roll for feeding a strip of paper a predetermined distance, means for actuating said roll, mechanism for feeding another strip of paper from an independent source of supply a relatively shorter distance, a rewinding spool for the last-mentioned strip of paper, and means for yieldingly forcing said re-winding spool into engagement with said feeding roll.

9. In an apparatus of the character described, the combination with check-feeding mechanism, of means for perforating or indenting the check, means for moving the check into engagement with said indenting means, and means for holding the check out of engagement therewith while the check-feeding mechanism is operating, said holding means coöperating with the check being issued.

10. In an apparatus of the character described, the combination with check-feeding mechanism, of means for perforating or indenting said check, a platen adapted to move the check into engagement with said indenting devices, and yielding means for holding the check out of engagement therewith while the check-feeding mechanism is operating, said holding means coöperating with the check being issued.

11. In an apparatus of the character described, a manually operable actuating device, a rock shaft actuated thereby, a spring for restoring said rock shaft to normal position, means for actuating paper feeding and issuing mechanism operated by said rock shaft, a frictionally driven winding spool coöperating with said paper feeding mechanism, wheels having raised characters on their periphery, a platen, means operated by said rock shaft for moving said platen so as to force the paper into engagement with said wheels, and means for holding the platen away from said wheels while the feeding mechanism is operating.

12. In an apparatus of the character described, the combination with a numbering wheel for canceling tickets by recording consecutive numbers thereon, means for simultaneously placing the train number and date on said tickets, means for issuing a check, means for feeding a record strip on which the station number of destination is recorded, a spool on which said strip is wound, and means operated by the check-issuing mechanism for operating the spool at a higher rate of speed than said record strip is fed.

13. In an apparatus of the character described, the combination with a casing having an opening through which the point of destination of the ticket being canceled may be manually inscribed on a check, numbering wheels for canceling tickets by recording consecutive numbers thereon, means for simultaneously placing the train number and date on said tickets, means for recording upon said check the said consecutive number, train number and date impressed upon said ticket and issuing said check at the time said ticket is canceled, and means for feeding a record strip on which the points of destination only are recorded.

14. In an apparatus of the character described, the combination with a casing having an opening through which the point of destination of the ticket being canceled may be manually inscribed on a check, numbering wheels for consecutively numbering tickets to be canceled, means for recording the train number and date upon said tickets as they are canceled, means for issuing said check at the time of canceling its complementary ticket, said check also bearing the consecutive cancellation number, train number and date of cancellation borne by the ticket, and means for making a permanent record of the several points of destination inscribed upon said checks as they are issued.

15. In an apparatus of the character described, the combination with a casing having an opening through which the point of destination of the ticket being canceled may be manually inscribed on a check, means for canceling tickets by recording consecutive numbers thereon, and means for issuing checks bearing said consecutive numbers as said tickets are canceled, said checks containing the manual inscription of the station of destination of their respective complementary tickets.

16. In an apparatus of the character described, the combination with a casing having an opening through which the point of destination of the ticket being canceled may be manually inscribed on a check, means for canceling tickets by recording consecutive numbers thereon, means for issuing checks bearing said consecutive numbers as said tickets are canceled, said checks containing the station of destination of their respective complementary tickets, and means for keeping a separate record of said destination of said tickets.

17. An apparatus of the character described, comprising a ticket-canceling means, means for issuing checks that serve as receipts for the canceled tickets, means for enabling manual inscriptions to be written on said checks prior to the issuance of same to the passengers, and means for showing the order in which said checks were issued.

18. An apparatus of the character described, comprising a ticket-canceling means, means for issuing checks that serve as receipts for the canceled tickets, means for enabling manual inscriptions to be inscribed on said checks prior to the issuance of same, and means for recording the manual inscriptions placed on said checks.

19. An apparatus of the character described, comprising a casing that is adapted to receive a plurality of checks, a ticket-canceling means, means for issuing said checks to serve as receipts for the canceled tickets, means in said casing for permitting a manual inscription to be written on each check prior to the issuance of same to show the relation which the check bears to the canceled ticket for which it was issued, and means for consecutively recording the manual inscriptions placed on said checks.

20. An apparatus of the character described, comprising a casing that is adapted to receive a plurality of checks, means for canceling a ticket, means for issuing checks consecutively to serve as receipts for the tickets that are canceled, and means for permitting the conductor or operator to write an inscription on each check, prior to its delivery from the casing so as to indicate the relation between the ticket and the check.

21. A conductor's cash fare register, consisting of a casing that is adapted to hold checks, means for issuing checks from said casing, means for canceling a ticket and placing an identification mark on a check, and means for enabling the conductor to write an inscription on a check prior to issuing same.

22. A conductor's cash fare register consisting of a casing that is adapted to hold checks, means for issuing checks from said casing, means for canceling a ticket and placing an identification mark on a check, means for enabling the conductor to write an inscription on a check manually prior to issuing same, and means for recording the manual inscription that the conductor places on the check.

23. An apparatus of the character described, comprising a casing that is adapted to receive a check strip and having an opening therein which permits inscriptions to be written on said check strip, mechanism for canceling a ticket and placing an identification mark on each portion of said check strip which contains a manual inscription, and means for feeding said check strip into such a position that a portion thereof can be severed to form a receipt for the canceled ticket.

24. An apparatus of the character described, comprising a casing that is adapted to receive a plurality of checks, means for issuing the checks from said casing, means for canceling a ticket and placing an identification mark on the check which relates to said canceled ticket prior to the delivery of the check from the casing, and means for permitting the conductor or operator to write an inscription on each check prior to its delivery from the casing so as to indicate the station of destination on the ticket to which the check relates.

25. An apparatus of the character described, comprising a casing that is adapted to receive a plurality of checks, means for issuing the checks from said casing, means for canceling a ticket and placing an identification mark on the check which relates to said canceled ticket prior to the delivery of the check from the casing, means for permitting the conductor or operator to write an inscription on each check prior to its delivery from the casing so as to indicate the station of destination on the ticket to which the check relates, and means arranged inside of said casing for recording the manual inscriptions which the conductor places on said checks.

26. An apparatus of the character described, comprising a casing for inclosing a check strip and a permanent record and provided with an opening that enables inscriptions to be inscribed on said check strip and record, means for canceling a ticket and placing an identification mark on the check strip, and means for issuing that portion of the check strip which contains said identification mark and manual inscription.

27. An apparatus of the character described, comprising a marking mechanism which is adapted to operate on a ticket and on a check that relates to the ticket, a casing for inclosing said check, means for permitting the conductor or operator to write an inscription on the check while it is still in the casing, means for recording said manual inscription, and means for delivering the check from the casing.

28. An apparatus of the character described, comprising a casing for inclosing a record strip and a check strip arranged in superimposed relation, the check strip being adapted to be separated into sections each of which constitutes a check, means for permitting an inscription to be made manually on the top strip, feeding-mechanism for said strips which feeds the check strip a greater distance than the record strip, and a ticket-canceling means.

29. An apparatus of the character described, comprising a casing for inclosing a record strip and a check strip arranged in superimposed relation, the check strip being adapted to be separated into sections each of which constitutes a check, means in said casing for permitting an inscription to be made manually on the top strip, feeding mechanism for said strips which feeds the check strip a greater distance than the record strip, and means for canceling a ticket and placing an identification mark on the check which relates to said canceled ticket.

In testimony whereof, I hereunto affix my signature in the presence of two witnesses, this twenty eighth day of April, 1911.

WILLIAM W. KAY.

Witnesses:
WELLS L. CHURCH,
GEORGE BAKEWELL.